US006474912B1

(12) United States Patent
Meeks

(10) Patent No.: US 6,474,912 B1
(45) Date of Patent: Nov. 5, 2002

(54) PNEUMATIC MAIL DELIVERY SYSTEM

(76) Inventor: Joseph L. Meeks, P.O. Box 10036, Columbus, OH (US) 43201

( * ) Notice: Subject to any disclaimer, the term of this patent is extended or adjusted under 35 U.S.C. 154(b) by 0 days.

(21) Appl. No.: 09/846,571

(22) Filed: May 1, 2001

(51) Int. Cl.$^7$ .............................................. B65G 51/34
(52) U.S. Cl. ........................ 406/13; 406/27; 406/188; 406/190; 406/191; 406/193
(58) Field of Search ........................... 406/13, 27, 188, 406/190, 191, 193

(56) References Cited

U.S. PATENT DOCUMENTS

| | | | |
|---|---|---|---|
| 3,618,874 A | 11/1971 | Kettering | |
| 3,659,809 A | 5/1972 | Cook | |
| 3,738,592 A | * 6/1973 | Smith et al. ................... | 243/19 |
| 4,111,282 A | 9/1978 | Vayda, Jr. | |
| 4,343,574 A | 8/1982 | Anders | |
| 4,362,443 A | * 12/1982 | Mallory et al. ............. | 406/188 |
| 4,437,797 A | 3/1984 | Kardinal | |
| 4,516,888 A | 5/1985 | Kardinal | |
| 4,820,086 A | 4/1989 | Kieronski | |
| 4,941,777 A | * 7/1990 | Kieronski ..................... | 406/13 |
| 5,174,689 A | * 12/1992 | Kondolf ....................... | 406/112 |
| 5,215,412 A | * 6/1993 | Rogoff et al. ............... | 406/112 |
| 5,356,243 A | 10/1994 | Vogel | |
| 5,518,545 A | 5/1996 | Miyano | |

* cited by examiner

*Primary Examiner*—Christopher P. Ellis
*Assistant Examiner*—Joe Dillon, Jr.
(74) *Attorney, Agent, or Firm*—Dale J. Ream

(57) ABSTRACT

A pneumatic mail delivery system includes a carrier having first and second open ends and corresponding hinged covers for selectably covering the open ends. The system includes first and second carrier terminals each having front openings selectively covered by hinged doors. The terminals may be positioned at a mail deposit location and a residential location. A pneumatic conduit connects the terminals through which the carrier may be guided therebetween. The conduit is connected to a blower for conveying the carrier. Spring-biased buttons attached to respective terminals are electrically connected to the blower for actuating the blower upon detecting a closure of a respective door. A photoelectric light sensor is attached to each terminal and is electrically connected to a light source mounted on the front of each terminal. Respective lights are energized when a respective light sensor detects mail in the carrier.

7 Claims, 4 Drawing Sheets

PNEUMATIC MAIL DELIVERY SYSTEM

BACKGROUND OF THE INVENTION

This invention relates generally to pneumatic tube systems and, more particularly, to a pneumatic mail delivery system that automatically delivers mail to a residence through a pneumatic conduit upon closure of a mailbox door.

Pneumatic tube systems have been used particularly in the banking industry for carrying objects between a customer's vehicle and the main bank building in order to facilitate banking transactions, such as in U.S. Pat. No. 4,343,574 to Anders. Other pneumatic tube systems have been utilized for carrying parts between locations, such as the system proposed in U.S. Pat. No. 5,518,545 to Miyano. Although assumably effective for their intended purposes, the existing systems are not particularly suited for the rapid delivery of mail between a delivery location and a residence.

Therefore, it is desirable to have a pneumatic mail delivery system in which a carrier is automatically conveyed between carrier terminals upon closure of a carrier terminal door. Further, it is desirable to have a pneumatic mail delivery system in which a mail delivery person or a residential occupant is visually alerted as to the presence of mail at a carrier terminal.

SUMMARY OF THE INVENTION

A pneumatic mail delivery system according to the present invention includes at least one carrier having a cylindrical configuration and constructed generally of a transparent material. The system includes at least first and second carrier terminals, the first carrier terminal operating as a mail delivery location displaced from a residence and the second carrier terminal positioned in the residence proper. A pneumatic conduit interconnects the first and second terminals through which the carrier may be guided between the terminals. A blower connected to the conduit provides the air differential needed to convey the carrier. It is understood that a plurality of first carrier terminals may be positioned together within a mailbox delivery cabinet, as in the case of an apartment complex. A corresponding second carrier terminal would be positioned in each apartment with corresponding terminals being interconnected by respective pneumatic conduits.

Each carrier terminal includes a front panel defining an opening in communication with the conduit. A spring-biased button is positioned within each opening and is electrically connected to the blower. A momentary depression of the button closes a circuit to enable the blower to be energized so as to convey the carrier between carrier terminals. Obviously, whether the blower actuates a pushing force or a pulling force (a vacuum) depends on which button was momentarily depressed. It is also understood that the activation buttons are also electrically connected to an electrical power source.

Automatic delivery of the carrier upon closure of the mailbox door enables a mail delivery person to quickly deliver mail to one or more residences without having to perform the additional step of pressing a send button. This is especially advantageous when delivering mail to a plurality of mailbox terminals housed in a single mailbox cabinet at an apartment complex. In that case, all of the mailbox terminal doors may be opened, mail may be appropriately inserted into each carrier, and then all the doors may be closed so as to cause delivery of each carrier to respective apartments.

Each carrier terminal further includes a photoelectric light sensor electrically connected to a light source that is mounted to the front panel of the carrier terminal. The light sensor is positioned so as to reflect a light across the conduit and through the transparent carrier when the carrier is positioned at that carrier terminal. If the light is broken, such as by mail within the carrier, the light sensor energizes the corresponding light source to indicate the presence of mail in the carrier.

Therefore, a general object of this invention is to provide a pneumatic mail delivery system which automatically conveys mail from a mail depository terminal to a residential terminal through a pneumatic conduit upon closure of a mailbox door.

Another object of this invention is to provide a pneumatic mail delivery system, as aforesaid, that is more convenient for both mail delivery and receipt.

Still another object of this invention is to provide a pneumatic mail delivery system, as aforesaid, which visually indicates the presence of mail in a carrier.

Yet another object of this invention is to provide a pneumatic mail delivery system, as aforesaid, which enables the carrier door to be closed simultaneously with closure of the mailbox door.

A further object of this invention is to provide a pneumatic mail delivery system, as aforesaid, in which mail may be inserted or removed from a carrier without having to remove the carrier from the pneumatic conduit.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3a is a perspective view as in FIG. 2 with a portion of the pneumatic conduit removed;

FIG. 3b is an isolated perspective view on an enlarged scale of the spring-biased button as in FIG. 3a.

DESCRIPTION OF THE PREFERRED EMBODIMENT

Figures 3A, 3B:
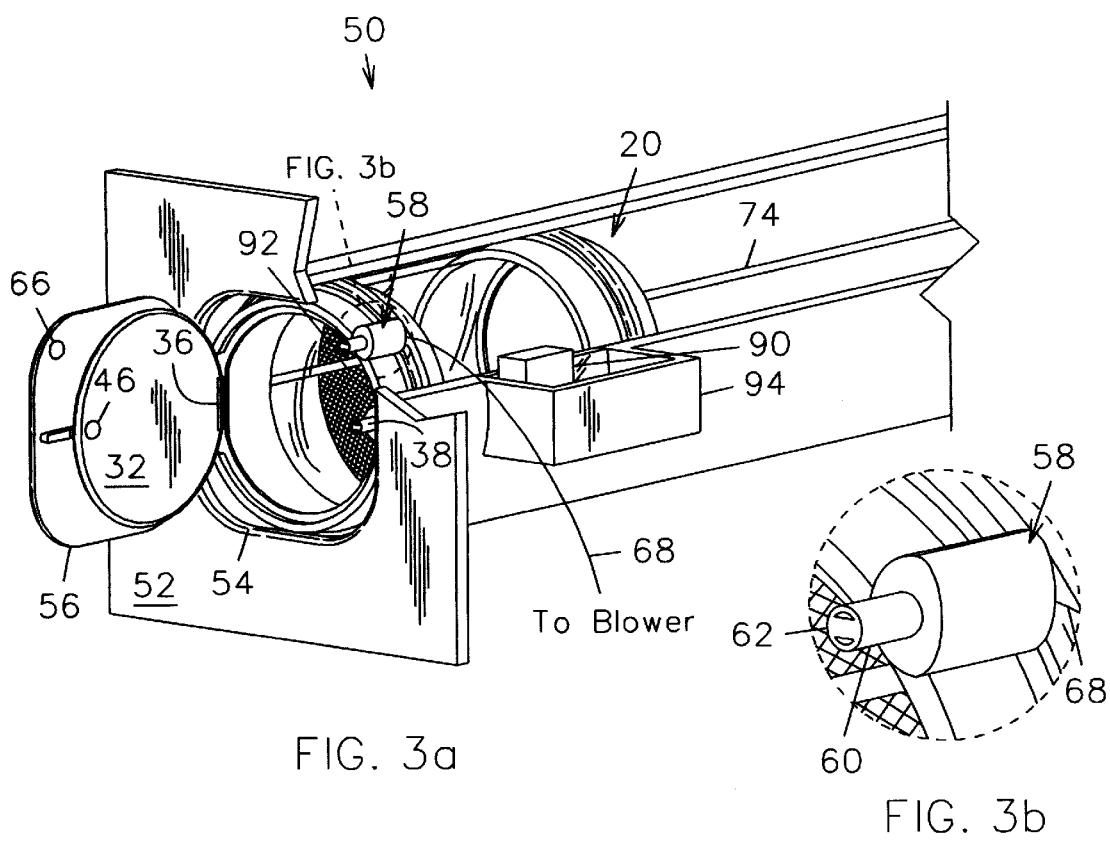
Figure 4:
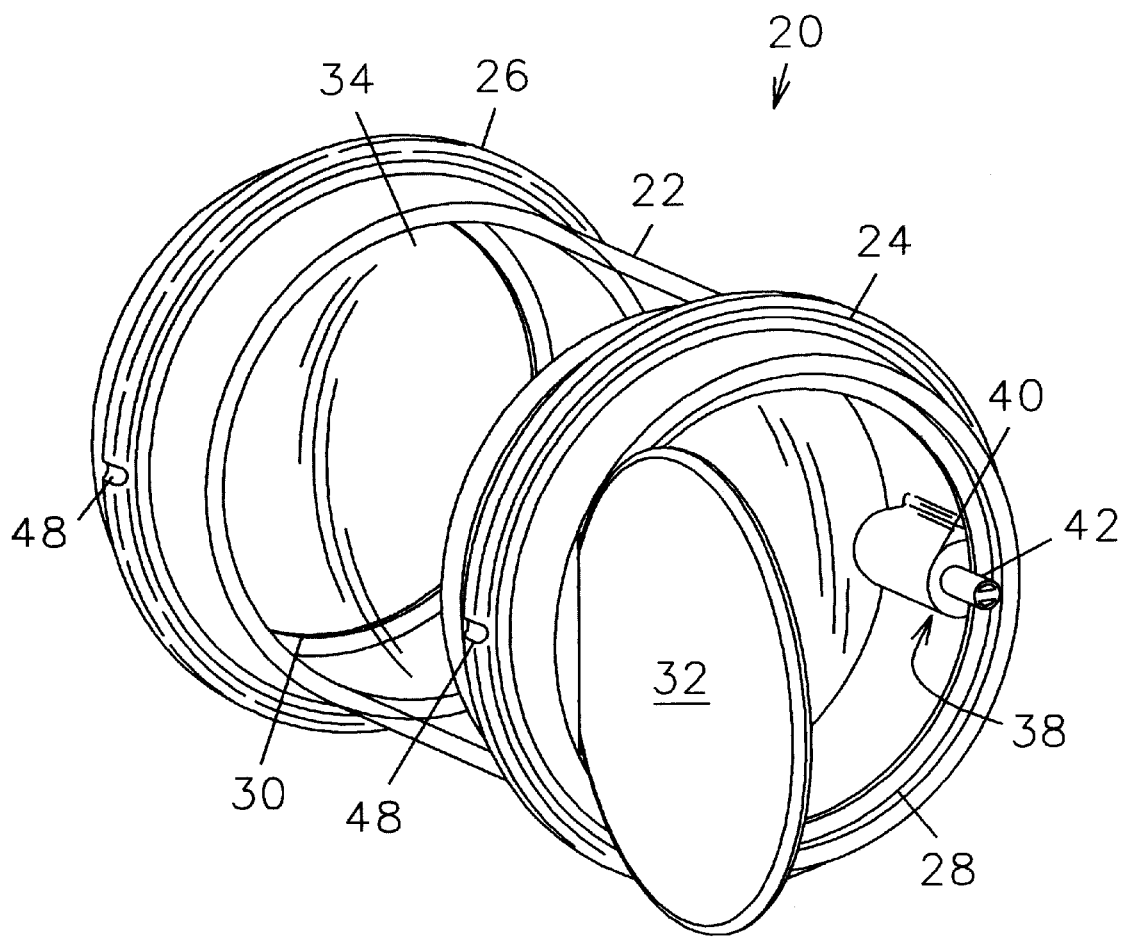
FIG. 4 is a perspective view of a carrier as in FIG. 3a removed from the carrier terminal.

A pneumatic mail delivery system 10 according to a preferred embodiment of the present invention will now be described in detail with reference to FIGS. 1 through 4 of the accompanying drawings. The pneumatic mail delivery system 10 includes at least one carrier 20 having a generally cylindrical configuration and substantially constructed of a transparent material (FIG. 4). The carrier 20 includes a body portion 22 intermediate a pair of opposed sealing rings 24, 26 (FIG. 4). Each sealing ring 24, 26 forms a peripheral rim about first 28 and second 30 open ends.

Figure 2:
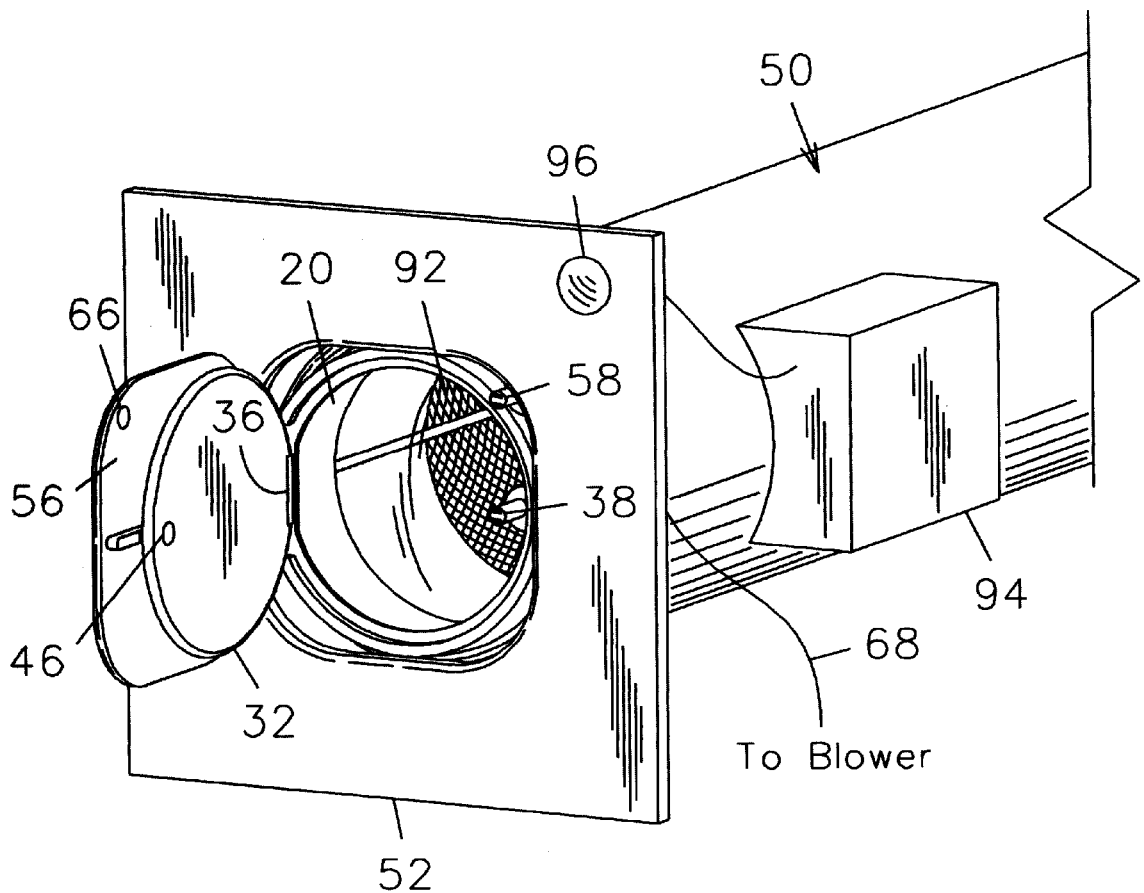
FIG. 2 is a fragmentary perspective view of the system as in FIG. 1 showing a carrier terminal with a carrier positioned therein.

The carrier 20 further includes first 32 and second 34 covers hingedly coupled to respective sealing rings 24, 26 for pivotal movement between open and closed configurations. Preferably, the covers 32, 34 are attached with a spring hinge 36 such that the covers are spring-biased toward respective open configurations (FIGS. 2 and 3). Each sealing ring 24, 26 includes a diameter larger than a diameter of the intermediate body portion 22. Further, each sealing ring 24, 26 defines a pair of oppositely positioned grooves 48, their function being further described below.

A latch 38 is positioned within each open end 28, 30 of the carrier 20 (FIG. 4). Each latch 38 includes a base 40 fixedly attached to an inner surface/rim of a respective sealing ring with a magnetic pin 42 reciprocatively positioned within the base 40. Each pin 42 is fastened within the base 40 with a compression spring (not shown) such that is biased to push the pin 42 outward. Each cover 32, 34 includes a metal disk 46 positioned to contact the tip of a magnetic pin 42 upon closure of the cover. The latch 38 is constructed to operate like a push button of a ball-point pen in that it may be depressed to magnetically hold a respective cover in a closed configuration or depressed again to release the cover via a spring action.

Figure 1:
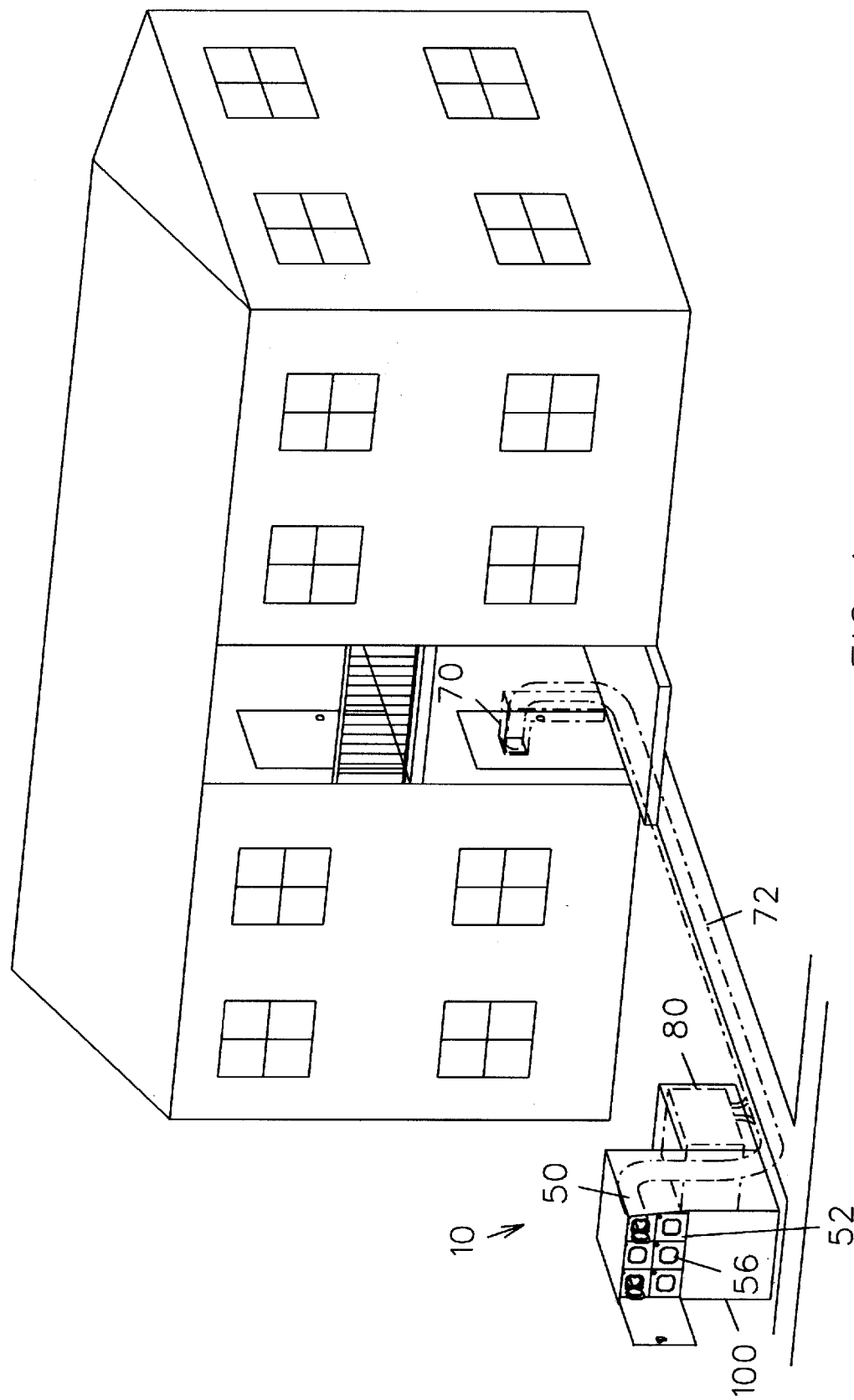
FIG. 1 is a perspective view of a pneumatic mail delivery system according to the present invention installed at an apartment complex.

The pneumatic mail system 10 further includes a first carrier terminal 50 (FIG. 2) positioned at a mail delivery location, such as the location of a traditional mailbox. This invention is especially advantageous where mailboxes are located at a street or road located some distance from a residence. The pneumatic mail system 10 further includes a second carrier terminal 70 located inside or adjacent to a residence, as shown in dashed lines in FIG. 1. The first 50 and second 70 carrier terminals are interconnected by a tubular pneumatic conduit 72 (FIG. 1). The conduit 72 defines an interior space through which the carrier 20 may be guided between the terminals. The first 50 and second 70 carrier terminals are integrally connected to the conduit 72. A pair of guide tracks 74 extend longitudinally along an inner surface of the conduit 72 and carrier terminals 50, 70 and are oppositely positioned 180° from one another therein (FIG. 3). Each sealing ring 24, 26 includes a diameter that is substantial equal to a diameter of the conduit 72 and carrier terminals so as to provide an air seal between the carrier 20 and conduit 72. The guide tracks 74 and sealing ring grooves 48 have complementary configurations that mate with one another so that the carrier 20 may be guided along the guide tracks 74 between terminals.

The pneumatic mail system 10 includes a blower 80 connected to the conduit 72 for transmitting an air stream thereto or receiving an air stream therefrom. In other words, the blower 80 is capable of blowing air or creating a vacuum and this air differential causes the carrier 20 to be conveyed between carrier terminals by exerting either a pushing or pulling force. The mechanics of conveying a carrier between carrier terminals using a blower is known in the art.

The first carrier terminal 50 will now be described in detail although it is understood that the first 50 and second 70 carrier terminals have a substantially similar construction. The first carrier terminal 50 includes a first front panel 52 defining an opening 54 in communication with the interior space of the first carrier terminal 50 and conduit 72 (FIG. 2). A first door 56 is pivotally coupled to the first front panel 52 with a spring hinge (not shown) such that the first door 56 may selectably close the opening 54 although the first door 56 is spring-biased to an open configuration. Another spring-loaded button 58 is mounted to the front panel 52 along the edge of the opening 54 (FIG. 3a). The button 58 includes a pin 60 having a magnetic tip 62 that is biased outwardly by an internally positioned compression spring (not shown). The first door 56 also includes a metal disk 66 mounted to its inner surface and positioned to contact the magnetic tip 62 when pivoted to its closed configuration. This button 58 also operates like that of a ball-point pen wherein a first depression of the button 58 (by a user depression of the first door) causes the pin 60 to retract and magnetically hold the first door 56 in a closed configuration. A second depression of the first door 56 and button 58 actuates a spring action strong enough to release the first door 56 to its normally open configuration. The pin 60 is electrically connected to the blower 80 with a wire 68. Obviously, the button 58 is also electrically connected to an electrical power source, such as traditional AC current or a battery (not shown).

When the button 58 is momentarily depressed in a manner indicative of closure of the first door 56, a circuit is closed (not shown) so as to enable the blower 80 to be energized. When energized, the blower 80 creates the appropriate air differential within the conduit 72 to convey the carrier 20 between carrier terminals. The blower 80 will cause the carrier 20 to be conveyed from the second to the first terminal or from the first to the second terminal depending on which button was pressed (i.e. indicating which door was closed).

A first photoelectric light sensor 90 is mounted to the first carrier terminal 50 and is positioned for directing a light beam across the tubular part of the first carrier terminal and against a reflector plate 92 (FIG. 3). The sensor 90 is held within a housing 94. When the carrier 20 is positioned at the first carrier terminal 50, the light beam shines and is reflected through the transparent material thereof. The sensor 90 is electrically connected to a light source 96 mounted to the first front panel 52. Preferably, the light source 96 is a red bulb. If the light beam of the sensor 90 is not reflected back to the sensor 90, the light source 96 is energized to indicate the presence of mail within the carrier 20. The light on the first front panel 52 is useful to notify a postal carrier that a resident has left mail to be picked up. It is understood that another light sensor, reflector plate, and light are mounted to the second carrier terminal in substantially the same manner as described above.

In use, the carrier 20 is initially positioned at the first carrier terminal 50 as a result of a resident having retrieved the previous day's mail and causing the carrier 20 to be returned upon closure of the second carrier terminal door. If outgoing mail was placed in the carrier 20 by the resident prior to closing the second carrier terminal door, this mail will be detected by the first photoelectric light sensor 90 and the first light source 96 will be energized so as to alert a postal carrier. The postal carrier may access the carrier 20 by depressing the first carrier terminal door 56 which causes both that door 56 and the first carrier cover 32 to spring open. Outgoing mail may then be removed through the open end of the carrier and first front panel opening and new mail may be delivered therethrough. A closure of the first carrier terminal door 56 simultaneously closes the corresponding carrier cover 32 and depresses a respective is spring-loaded blower activation button 58. Activation of the blower 80 causes an appropriate air differential within the conduit 72 to convey the carrier either from the first to the second carrier terminal or vice versa. The light source 96 is de-energized when the carrier 20 is sent as the reflection of the light beam of the sensor 90 is restored.

Although the pneumatic mail system 10 has been described hereto as including a single first carrier terminal 50, second carrier terminal 70, with a single conduit 72 extending therebetween, it should be appreciated that a plurality of first carrier terminals may be housed within a mailbox cabinet 100 as shown in FIG. 1. Each of these plurality of first carrier terminals corresponds to a second carrier terminal with a corresponding conduit extending therebetween and with a corresponding carrier within the conduit. Each conduit is connected to a common blower 80 as described above. Thus, mail to a plurality of residences, such as in an apartment complex, may be delivered quickly from a single depository location.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A pneumatic mail delivery system, comprising:
    a plurality of carriers, each carrier defining first and second open ends and having first and second covers for selectively closing respective first and second open ends;
    a mailbox cabinet having a plurality of first carrier terminals positioned therein, each first carrier terminal having a first front panel defining a first opening and a first door hingedly coupled to said first front panel for selectively closing said first opening;
    first sensing means mounted to each of said plurality of first carrier terminals for sensing a closure of a respective first door;
    a plurality of second carrier terminals mounted at selected residential locations displaced from said mailbox cabinet, each second carrier terminal having a second front panel defining a second opening and a second door coupled to said second front panel for selectively closing said second opening;
    second sensing means mounted to each of said plurality of second carrier terminals for sensing a closure of a respective second door;
    a plurality of elongate pneumatic conduits interconnecting respective first and second carrier terminals, each conduit defining an internal space within which respective carriers are guided between respective first and second carrier terminals;
    a blower connected to said plurality of conduits and electrically connected to each first and second sensing means for actuating a pressure differential within a respective conduit capable of moving a respective carrier from a respective first carrier terminal to a corresponding second carrier terminal upon a respective first sensing means sensing a closure of a respective first door and capable of moving a respective carrier from a respective second carrier terminal to a corresponding first carrier terminal upon a respective second sensing means sensing a closure of a respective second door;
    a plurality of first photoelectric light sensors mounted to respective first carrier terminals; and
    a plurality of first light sources mounted to respective first front panels of said plurality of first carrier terminals, each first photoelectric light sensor electrically connected to a corresponding first light source and adapted to energize said corresponding first light source upon detecting mail within a first respective carrier terminal.

2. The pneumatic mail delivery system as in claim 1, further comprising:
    a plurality of second photoelectric light sensors mounted to respective second carrier terminals; and
    a plurality of second light sources mounted to respective second front panels of said plurality of second carrier terminals, each second photoelectric light sensor electrically connected to a corresponding second light source and adapted to energize said corresponding second light source upon detecting mail within a second respective carrier terminal.

3. The pneumatic mail delivery system as in claim 1 wherein:
    each conduit includes a pair of oppositely positioned guide tracks extending longitudinally along an inner surface thereof; and
    each carrier includes a pair of sealing rings, each sealing ring extending peripherally about respective open ends and having a diameter substantially the same as a diameter of a respective conduit so as to provide an air seal between said carrier and said respective conduit, each sealing ring defining a pair of oppositely positioned grooves complementary to a respective pair of guide tracks such that said respective carrier is guided along a respective pair of guide tracks within a corresponding conduit.

4. The pneumatic mail delivery system as in claim 1 wherein:
    respective first and second doors are hingedly coupled to respective first and second front panels with each door being selectably movable between open and closed configurations relative to respective openings and being spring biased toward respective open configurations; and
    each of said first and second sensing means includes a spring biased button positioned in a respective opening, each button being electrically connected to said blower and adapted to enable said blower to be energized upon a momentary depression thereof.

5. The pneumatic mail delivery system as in claim 1 wherein each carrier includes a cylindrical configuration and is constructed of a transparent material.

6. The pneumatic mail delivery system as in claim 1 wherein said plurality of first and second covers are hingedly coupled to respective carriers at respective first and second open ends, each cover being selectably movable between open and closed configurations and being spring biased to said open configurations.

7. The pneumatic mail delivery system as in claim 6 further comprising a plurality of latches positioned at respective open ends of said plurality of carriers, each latch having a base mounted to a respective rim of a respective carrier and having a magnetic pin reciprocatively mounted in said base and adapted to selectably hold a respective cover at said closed configuration and release said respective cover to said open configuration.

\* \* \* \* \*